United States Patent
Takagaki (10) Patent No.: US 8,827,514 B2
(45) Date of Patent: Sep. 9, 2014

(54) VEHICLE LIGHT DISTRIBUTION CONTROL APPARATUS AND METHOD

(75) Inventor: Tatsuya Takagaki, Nisshin (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 13/696,731

(22) PCT Filed: Aug. 6, 2010

(86) PCT No.: PCT/JP2010/063423
§ 371 (c)(1),
(2), (4) Date: Nov. 7, 2012

(87) PCT Pub. No.: WO2012/017559
PCT Pub. Date: Feb. 9, 2012

(65) Prior Publication Data
US 2013/0155704 A1    Jun. 20, 2013

(51) Int. Cl.
*B60Q 1/08* (2006.01)
*B60Q 1/14* (2006.01)

(52) U.S. Cl.
CPC *B60Q 1/143* (2013.01); *B60Q 1/08* (2013.01); *B60Q 2300/45* (2013.01)
USPC ........................................... 362/466; 382/104

(58) Field of Classification Search
CPC ........ B60Q 1/08; B60Q 1/1423; B60Q 1/143; B60Q 2300/056; B60Q 2300/45
USPC ................... 362/465, 466; 382/184
See application file for complete search history.

(56) References Cited

U.S. PATENT DOCUMENTS 6,587,573 B1 *    7/2003   Stam et al. .................... 382/104
2007/0253210 A1   11/2007  Hasegawa

FOREIGN PATENT DOCUMENTS

| EP | 2 098 775 A2 | 9/2009 |
|---|---|---|
| JP | 62-253545 A | 11/1987 |
| JP | 2-10141 U | 1/1990 |
| JP | 2007-290612 A | 11/2007 |
| JP | 2009-211963 A | 9/2009 |
| JP | 2010-162960 A | 7/2010 |
| WO | 2008/037388 A2 | 4/2008 |

OTHER PUBLICATIONS

Bernd Dreier et al., "Camera Controlled Adaptive Cut-off and Adaptive Partial High Beam Applications", Automotive Lighting Reutlingen, 2009, 8th International Symposium on Automotive Lighting, version 13.
International Search Report for PCT/JP2010/063423 dated Nov. 16, 2010.

* cited by examiner

Primary Examiner — Nimeshkumar Patel
Assistant Examiner — Steven Horikoshi
(74) Attorney, Agent, or Firm — Sughrue Mion, PLLC (57) ABSTRACT

A vehicle light distribution control apparatus includes a camera and lighting apparatus. A controller detects an image portion in an image captured by the camera as an object estimated as another vehicle when the image portion meets a predetermined criterion, and controls a light distribution of the illumination light based on a detection result. When the controller detects the object estimated as another vehicle within an illumination region of the illumination light, it limits the illumination region of the illumination light such that the object estimated as another vehicle is not illuminated by the illumination light, and then when it does not detect an object estimated as another vehicle within a non-illumination region of the illumination light due to the limitation, it restricts a cancellation of the limitation of the illumination region of the illumination light until a predetermined cancellation criteria is met.

4 Claims, 7 Drawing Sheets

VEHICLE LIGHT DISTRIBUTION CONTROL APPARATUS AND METHOD

CROSS REFERENCE TO RELATED APPLICATIONS

This application is a National Stage of International Application No. PCT/JP2010/063423 filed Aug. 6, 2010, contents of which are incorporated herein by reference in their entirety.

TECHNICAL FIELD

The present invention is related to a vehicle light distribution control apparatus and a method of controlling a vehicle light distribution.

BACKGROUND ART

A technique for controlling the light distribution of the illumination light for illuminating the forward direction of a vehicle based on the detection result of another vehicle with a camera such that glare does not occur in another vehicle such as a preceding vehicle and an oncoming vehicle is known (see Patent Documents 1 and 2 and Non-Patent Document 3, for example).

[Patent Document 1] Japanese Laid-open Patent Publication No. 2009-211963
[Patent Document 2] WO2008/037388
[Non-Patent Document 3] "Camera Controlled Adaptive Cut-off and Adaptive Partial High Beam Applications" by Bernd Dreier, Ernst-Olaf Rosenhahn (Automotive Lighting Reutlingen, Germany) in a brochure of "8th International Symposium on Automotive Lighting 2009 version 13"

DISCLOSURE OF INVENTION

Problem to be Solved by Invention

However, there may be a case where an object such as a reflecting plate on the side of the road or the like is erroneously detected by the camera as another vehicle. In such a case, the illumination region of the illumination light is limited such that the object erroneously detected as another vehicle is not illuminated. Once such a limitation of the illumination region is performed, since the object such as the reflecting plate on the side of the road or the like is not illuminated with the illumination light, it is easily detected by the camera as another vehicle erroneously again. In such a case, if the limitation of the illumination region is canceled (i.e., the illumination region is restored to the original region before the limitation), the reflecting plate on the side of the road or the like is illuminated again with the illumination light, and thus the reflecting plate on the side of the road or the like may be erroneously detected as another vehicle again. Then, again, the illumination region of the illumination light is limited such that the object erroneously detected as another vehicle is not illuminated. In this way, there is a problem that the limitation of the illumination region of the illumination light and the cancellation of the limitation is needlessly repeated due to the object (a not-another vehicle) such as the reflecting plate on the side of the road or the like.

Therefore, an object of the present invention is to provide a vehicle light distribution control apparatus and a method of controlling a vehicle light distribution which can appropriately reduce the problem that the limitation of the illumination region of the illumination light and the cancellation of the limitation is needlessly repeated due to the object such as a reflecting plate on the side of the road or the like.

Means to Solve the Problem

According to an aspect of the present invention a vehicle light distribution control apparatus is provided, which includes a camera configured to capture a scene in a forward direction of the vehicle;

a lighting apparatus configured to illuminate a forward direction of the vehicle with illumination light; and a controller configured to detect an image portion in an image captured by the camera as an object estimated as another vehicle when the image portion meets a predetermined criterion, and control a light distribution of the illumination light based on a detection result, wherein if the controller detects the object estimated as another vehicle within an illumination region of the illumination light, the controller limits the illumination region of the illumination light such that the object estimated as another vehicle is not illuminated by the illumination light, and if the controller does not detect an object estimated as another vehicle within a non-illumination region of the illumination light, the non-illumination region being generated due to the limitation, the controller restricts a removal of the limitation of the illumination region of the illumination light until a predetermined removal criteria is met.

According to another aspect of the present invention a method of controlling a vehicle light distribution is provided, which includes obtaining an image from a camera which captures a scene in a forward direction of the vehicle;

illuminating a forward direction of the vehicle with illumination light of a lighting apparatus;

detecting an image portion in an image captured by the camera as an object estimated as another vehicle when the image portion meets a predetermined criterion;

limiting an illumination region of the illumination light such that the object estimated as another vehicle is not illuminated by the illumination light if the object estimated as another vehicle is detected within the illumination region of the illumination light; and after having limited the illumination region of the illumination light, restricting a cancellation of the limitation of the illumination region of the illumination light, if an object estimated as the another vehicle within a non-illumination region of the illumination light is not detected, the non-illumination region being generated due to the limitation, until a predetermined cancellation criteria is met.

Advantage of the Invention

According to the present invention, a vehicle light distribution control apparatus and a method of controlling a vehicle light distribution can be obtained which can appropriately reduce the problem that the limitation of the illumination region of the illumination light and the cancellation of the limitation is needlessly repeated due to the object such as the reflecting plate on the side of the road or the like.

DESCRIPTION OF REFERENCE SYMBOLS 1 vehicle light distribution control apparatus
10 image sensor
20 switch
30 vehicle information acquiring part
40 control ECU
42 image recognition part
44 headlamp controlling part
46 lampshade controlling part
50 headlamp
51 headlamp part
52 lamp shade part

BEST MODE FOR CARRYING OUT THE INVENTION

In the following, embodiments for carrying out the present invention will be described in detail by referring to the accompanying drawings.

Figure 1:
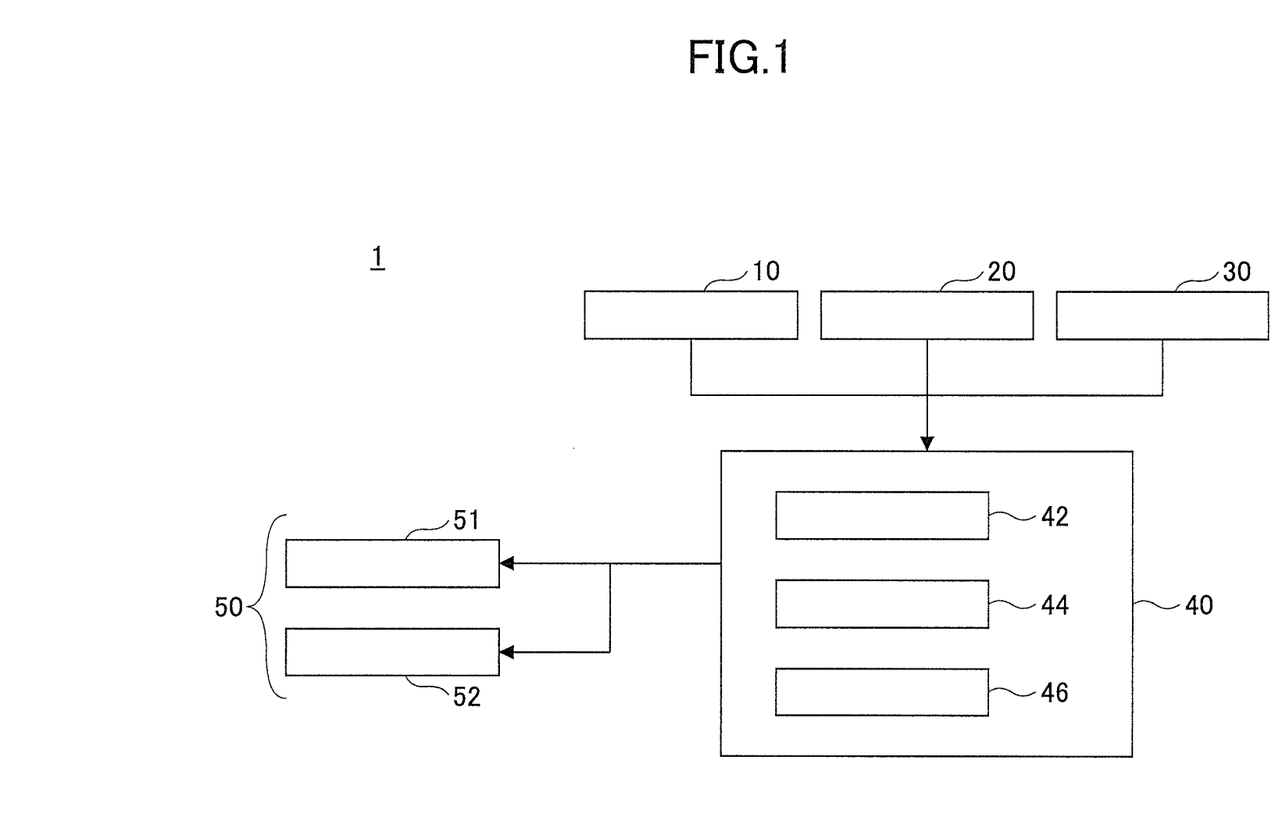
FIG. 1 is a diagram for illustrating a main configuration of a vehicle light distribution control apparatus 1 according to an embodiment.

FIG. 1 is a diagram for illustrating a main configuration of a vehicle light distribution control apparatus 1 according to an embodiment. The vehicle light distribution control apparatus 1 includes an image sensor 10, a switch 20, a vehicle information acquiring part 30, a control ECU (Electronic Control Unit) 40, and headlamps 50.

The image sensor 10 includes a camera which captures an image of a scene in front of the vehicle (i.e., a front circumstance image) with image sensing elements such as CCD (charge-coupled device) and CMOS. (complementary metal oxide semiconductor). The image sensor 10 is installed in the vehicle such that it can image the scene in front of the vehicle. For example, the image sensor 10 is attached to a back side of a room mirror (i.e., a surface facing to the front side of the vehicle). The image sensor 10 may obtain the front circumstance image in real time during driving of the vehicle, and supply the control ECU 40 with the front circumstance image in an image data stream at every predetermined frame cycle. It is noted that the image sensor 10 may be a dedicated sensor for a vehicle light distribution control as described below or may be used commonly with other applications (for example, a front monitoring camera, a camera for lane keeping assist). Further, the image sensor 10 may be a camera which obtains either of a color image and a monochrome image.

The switch 20 includes switches related to headlamp operations such as for on/off of the headlamps 50, on/off of the light distribution control of the headlamps 50, etc. The switch 20 may be disposed at an appropriate location in the cabin of the vehicle such as a steering column, for example.

The vehicle information acquiring part 30 acquires various items of information (vehicle information) of the vehicle. The vehicle information acquiring part 30 may be various vehicle-installed sensors (a steering sensor, wheel speed sensors, etc., for example), various ECUs and various actuators.

The control ECU 40 mainly includes a microprocessor that includes a CPU, a ROM, a RAM, etc., which are interconnected via buses (not shown).

The headlamp 50 includes a headlamp part 51 and a lamp shade part 52. The headlamp 50 includes a low-beam headlamp and a high-beam headlamp which illuminate visible light toward a region in front of the vehicle. The lamp shade part 52 includes a lamp shade (shade plate) for blocking a light path of the light from the high-beam headlamp. The lamp shade part 52 includes an actuator which drives the lamp shade (a shutter) for changing an illumination region (a blocking region) of the high-beam headlamp. It is noted that the shape of the lamp shade and the driving mechanism thereof for changing the illumination region (blocking region) of the high-beam headlamp may be arbitrary. For example, the illumination region of the high-beam headlamp may be changed by driving the lampshade via a swivel mechanism, gears and a stepper motor. It is noted that the shape of the lamp shade and the driving mechanism thereof may be configured utilizing the shape and the driving mechanism disclosed in Patent Documents 1, 2 and Non-Patent Document 3 described above.

The control ECU 40 includes as main functions an image recognition part 42, a headlamp controlling part 44, and a lampshade controlling part 46. The parts 42, 44, and 46 may be implemented by the CPU executing programs stored in a storage device such as ROM. Further, for example, the image recognition part 42 may be implemented by dedicated hardware circuits. Further, the parts 42, 44, and 46 are not necessarily incorporated in the same ECU unit and thus may be implemented by several ECUs in cooperation.

The image recognition part 42 perform image processing of the front circumstance images obtained from the image sensor 10 to detect another vehicle (such as a preceding vehicle or an oncoming vehicle) which may exist in front of the vehicle (i.e., the host vehicle). A way of detecting another vehicle in the image may be various and an arbitrary way may be adopted. Typically, another vehicle is a moving object which emits light from brake lamps and the headlamps and includes at its rear portion the reflective portions (i.e., reflectors) at which light from, the back side is reflected. Thus, another vehicle may be detected in the image based on such features. For example, if the features of the light in the image (such as brightness, a color, a size, a pattern, motion, etc.) meet a predetermined criterion, the image portion related to the light may be detected as an object estimated as another vehicle (vehicle-estimated object). More specifically, an example of a way of detecting another vehicle may perform the image processing of the front circumstance images obtained from the image sensor 10 to detect the light portions in the image (i.e., pixels whose brightness is more than a predetermined value), and then determines whether the respective light portions result from another vehicle or the disturbance light other than the light from another vehicle (such as reflected light from the reflective plate of road signs) based on factors of the brightness, the motion of the light portion (for example, a speed of the lighting object, a traveling direction thereof, etc) and the color (for example, a color of the light emitted from the brake lamps, a color of the reflected light at the reflective portions). The image recognition part 42 may calculate a position, a direction (lateral position), etc., of the vehicle-estimated object when it detects the existence of the vehicle-estimated object.

The headlamp controlling part 44 switches between an ON state and a OFF state of the headlamps 50 based on the status of the switch 20. It is noted that the headlamp controlling part 44 may perform control for automatically turning on the headlamps 50 when an environment becomes dark.

The lampshade controlling part 46 executes a light distribution control of the headlamp part 51 when the light distribution control of the headlamps 50 is in its ON state based on the status of the switch 20. Specifically, the lampshade controlling part 46 drives the lamp shade to control the illumination region of the high-beam headlamp of the headlamp 50 based on the detection status of the vehicle-estimated object by the image recognition part 42. Basically, the lampshade controlling part 46 limits the illumination regions of the high-beam headlamps based on the position, the direction, etc., of the vehicle-estimated object obtained from the image recognition part 42 such that the vehicle-estimated object is not illuminated by the high-beam headlamps. It is noted that the controlling way used in the lampshade controlling part 46 is described hereinafter in detail.

Figure 2:
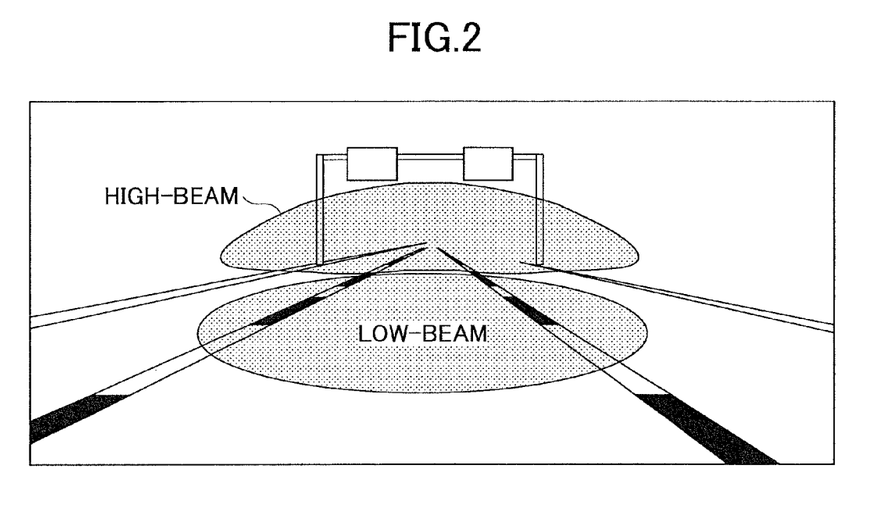
FIG. 2 is a diagram for illustrating an example of an illumination region of a headlamp 50 in a normal status.

FIG. 2 is a diagram for illustrating an example of an illumination region of a headlamp 50 in a normal status. It is noted that FIG. 2 illustrates the scene of the front circumstance image. As illustrated in FIG. 2, if the light distribution control of the headlamps 50 is in its ON status and no vehicle-estimated object is detected by the image recognition part 42, the illumination regions of the high-beam headlamps of the headlamps 50 are not limited at all as usual.

Figure 3:
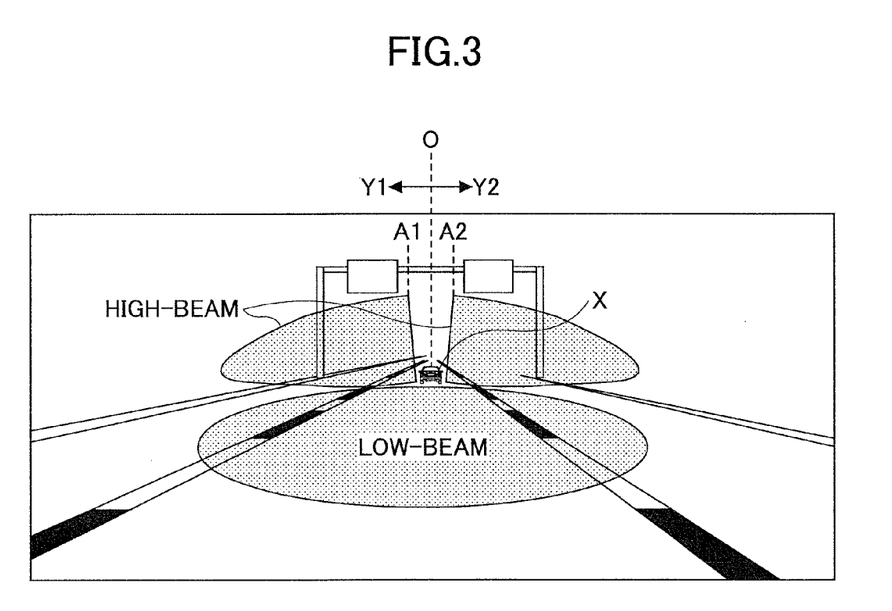
FIG. 3 is a diagram for illustrating an example of a way of limiting the illumination regions of high-beam headlamps of the headlamp 50.

FIG. 3 is a diagram for illustrating an example of a way of limiting the illumination regions of high-beam headlamps of the headlamp 50. It is noted that FIG. 3 illustrates the scene of the front circumstance image. As illustrated in FIG. 3, if the light distribution control of the headlamps 50 is in its ON status and the vehicle-estimated object is detected by the image recognition part 42, the illumination regions of the high-beam headlamps are limited such that the vehicle-estimated object is not illuminated by the high-beam headlamps. In the example illustrated in FIG. 3, the illumination regions of the high-beam headlamps are limited such that the limitation extends in the right and left directions (Y1 and Y2 directions) from a center line O in the lateral direction. Specifically, the illumination regions of the high-beam headlamps are limited according to the lateral position of the vehicle-estimated object X such that the limitation on the illumination region of the left high-beam headlamp extends to the line A1 (the line offset in the left direction with respect to the left end of the vehicle-estimated object X) and the limitation on the illumination region of the right high-beam headlamp extends to the line A2 (the line offset in the right direction with respect to the right end of the vehicle-estimated object X). Here, the lateral position of the vehicle-estimated object X may be calculated by the image recognition part 42. The relationship between the lateral position (calculated value) of the vehicle-estimated object X and the position of the lampshade, that is to say, the limitation positions (the lines A1 and A2 in the illustrated example) of the illumination regions of the high-beam headlamps may be designed in advance and stored in a form of map data.

Figure 4:
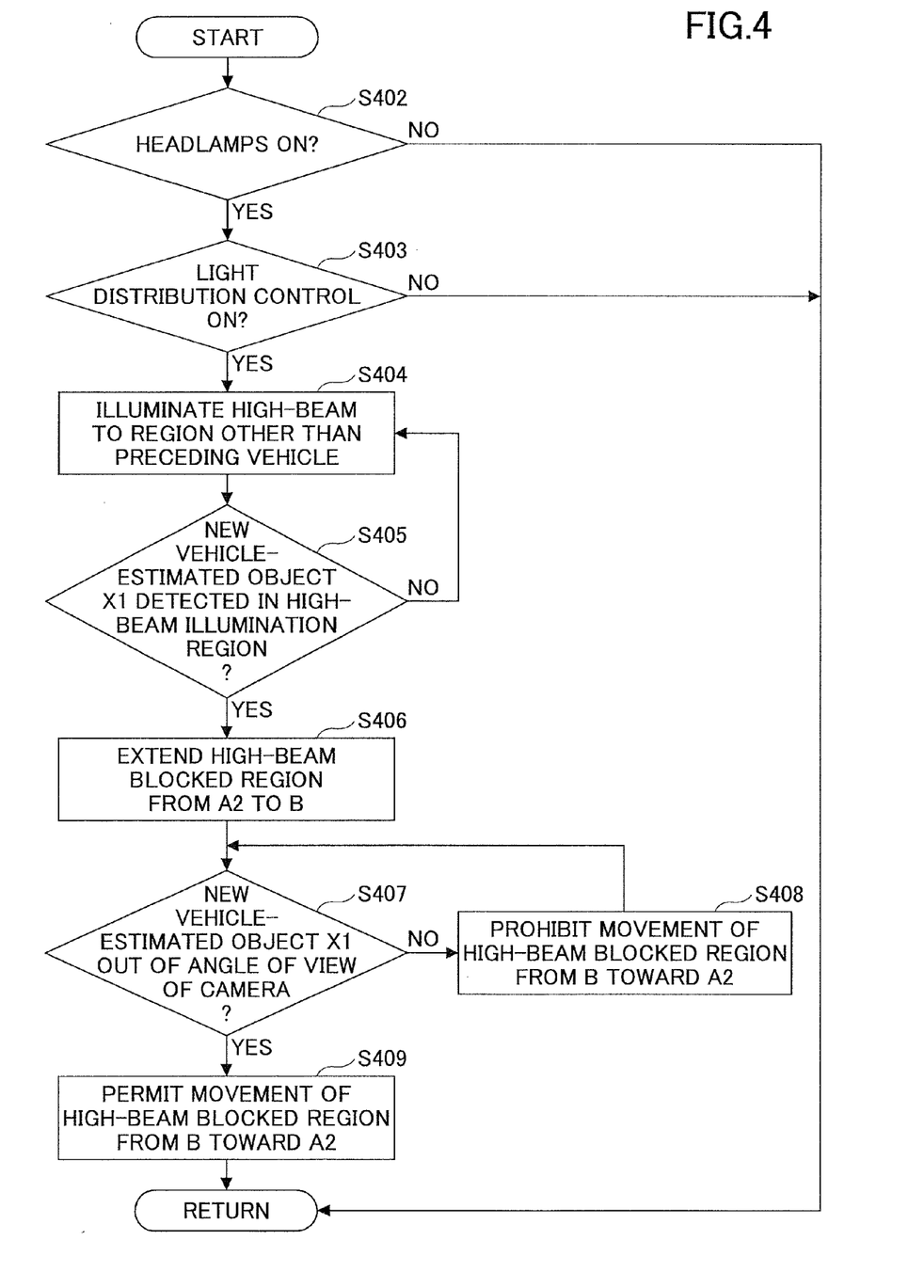
FIG. 4 is an example of a flowchart of a main process executed by a control ECU 40 according to the embodiment.

FIG. 4 is an example of a flowchart of a main process executed by the control ECU 40 according to the embodiment. The process routine shown in FIG. 4 may be initiated when an ignition switch of the vehicle is turned on.

In step 402, it is determined based on the status of the switch 20 whether the headlamps 50 are in their ON state. If the headlamps 50 are in their ON state, the process routine goes to step 403. On the other hand, if the headlamps 50 are in their OFF states, the process routine ends without executing any processes.

In step 403, it is determined based on the status of the switch 20 whether the light distribution control of the headlamps 50 is in its ON state. If the light distribution control of the headlamps 50 is in its ON state, the process routine goes to step 404. On the other hand, if the light distribution control of the headlamps 50 is in its OFF state, the process routine ends without executing any processes.

It is noted that when the processes from the step 404 are to be executed, the image recognition part 42 performs the image processing for the front circumstance images supplied in real time from the image sensor 10 to continuously determine (track) whether there is another vehicle (a preceding vehicle and an oncoming vehicle) in the forward direction of the vehicle. Here, it is assumed that the preceding vehicle is detected as the vehicle-estimated object.

In step 404, the lampshade controlling part 46 limits the illumination regions of the high-beam headlamps such that the preceding vehicle is not illuminated by the high-beam headlamps. In other words, the lampshade controlling part 46 limits the illumination regions of the high-beam headlamps such that the region other than the region in which the preceding vehicle is located is illuminated by the high-beam headlamps. In the illustrated example, as described above, the illumination regions of the high-beam headlamps are limited according to the lateral position of the vehicle-estimated object X such that the limitation on the illumination region of the left high-beam headlamp extends to the line A1 and the limitation on the illumination region of the right high-beam headlamp extends to the line A2. Thus, the preceding vehicle detected as the vehicle-estimated object is not illuminated by the high-beam headlamps of the rearward vehicle, which prevents the driver of the preceding vehicle from noticing the glare due to the high-beam headlamps of the rearward vehicle. It is noted that the positions of the lines A1 and A2 may be changed dynamically according to the change in the position, etc., of the vehicle-estimated object X (the preceding vehicle in the example illustrated in FIG. 3) which is updated constantly.

In step 405, it is determined whether a new vehicle-estimated object is detected in the current illumination regions of the high-beam headlamps by the image recognition part 42. If it is determined that a new vehicle-estimated object is detected in the illumination regions of the high-beam headlamps, the process routine goes to step 406. Otherwise the process routine returns to step 404.

Figure 5A:
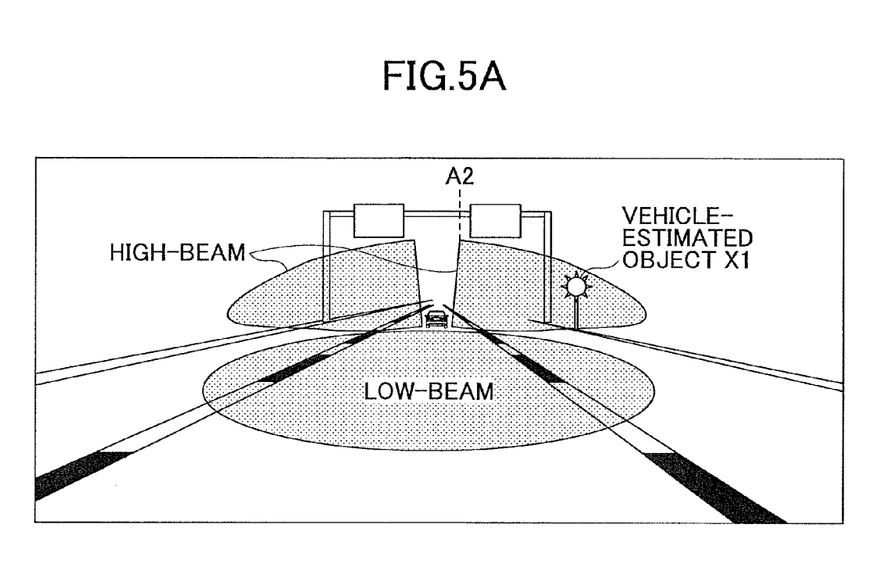
FIG. 5A is a diagram for illustrating an example of a situation in which an object other than another vehicle such as reflecting objects (a sign or the like) is detected as a vehicle-estimated object X1.
Figure 5B:
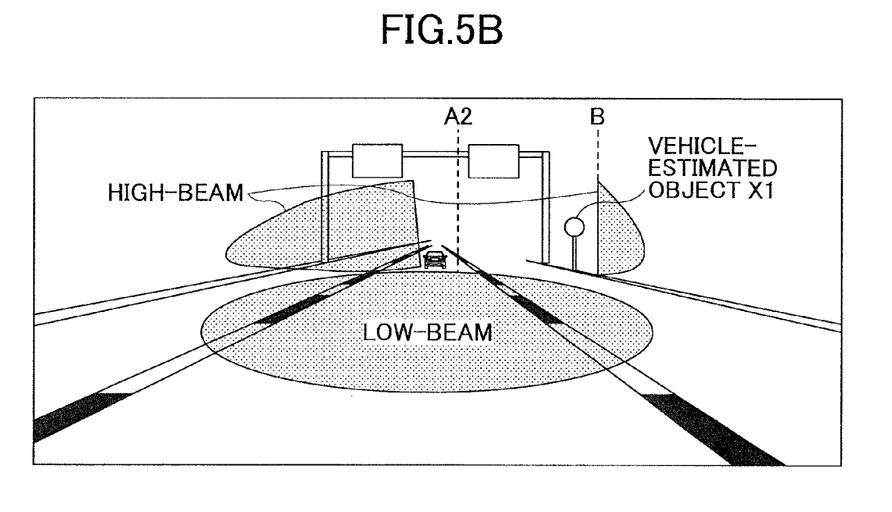
FIG. 5B is a diagram for illustrating an example of a way of limiting the illumination regions of high-beam headlamps under the situation illustrated in FIG. 5A.

In step 406, the lampshade controlling part 46 limits the illumination regions of the high-beam headlamps such that the new vehicle-estimated object is not illuminated by the high-beam headlamps. For example, as illustrated in FIG. 5A, when the reflecting object on the road (a sign or the like) enters the illumination regions of the high-beam headlamps, the reflected light from the reflecting object is captured in the front circumstance image. In this case, there may be a case where the image recognition part 42 detects the object (the reflecting object such as a sign or the like) emitting the reflected light as the new vehicle-estimated object. In such a case, the lampshade controlling part 46 limits the illumination regions of the high-beam headlamps such that the new vehicle-estimated object X1 is not illuminated by the high-beam headlamps, as illustrated in FIG. 5B. Specifically, the illumination regions of the high-beam headlamps are limited according to the lateral position of the vehicle-estimated object X1 such that the limitation on the illumination region of the right high-beam headlamp extends to the line B (the line offset in the right direction with respect to the right end of the vehicle-estimated object X1). In other words, an illumination blocked region of the right high-beam headlamp is changed from the region between the line O and the line A2 (see FIG. 5A) to the region between the line O and the line B (see FIG. 5B). It is noted that the FIG. 5A and FIG. 5B illustrate the scene of the front circumstance image.

In step 407, it is determined in the image recognition part 42 whether the image portion related to the new vehicle-estimated object detected in step 405 moves out of a detection region of the image sensor 10 (i.e., the angle of view of the camera). At that time, the image portion related to the new vehicle-estimated object detected in step 405 may be tracked to be identified in the front circumstance images successively obtained in a time series, or may be identified independently in the respective front circumstance images. In any case, if the image portion related to the new vehicle-estimated object detected in step 405 moves out of the angle of view of the camera, the image portion related to the new vehicle-estimated object detected in step 405 is no longer captured in the front circumstance image by the image sensor 10. In that case, the process routine goes to step 409. On the other hand, during the image portion related to the new vehicle-estimated object detected in step 405 being captured by the image sensor 10, the process of step 407 is repeated via step 408.

Here, as illustrated in FIG. 5A, once the object other than another vehicle, such as the reflecting object on the road (such as a sign or the like), is detected as the vehicle-estimated object and thus the illumination regions of the high-beam headlamps are limited such that the new vehicle-estimated object X1 is not illuminated by the high-beam headlamps as illustrated in FIG. 5B, the object detected as the new vehicle-estimated object X1 is not illuminated by the high-beam headlamps. As a result of this, since the light (reflected light) from the object detected as the new vehicle-estimated object X1 substantially disappears (or is weakened), the object detected as the new vehicle-estimated object X1 is not detected in the subsequent front circumstance images as the vehicle-estimated object by the image recognition part 42. Therefore, according to an ordinary rule, the illumination blocked region of the high-beam headlamp extended in step 406 is restored to the original state because the object detected as the new vehicle-estimated object X1 is not detected as the vehicle-estimated object. However, if the illumination blocked region of the high-beam headlamp is restored to the original state, the same reflecting object is detected again as the vehicle-estimated object by the image recognition part 42. Then, again, the illumination regions of the high-beam headlamps are limited such that the reflecting object is not illuminated by the high-beam headlamps. If the expansion and the reduction of the illumination regions of the high-beam headlamps are thus repeated, an undesired glare may be noticed by the driver of other vehicles such as the preceding vehicle and the oncoming vehicle or misunderstood as a passing attempt (representing the intension to pass the vehicle). Further, it is not desirable in terms of the marketability.

Therefore, according to the present embodiment, a logic is incorporated so that the repetition of the expansion and the reduction of the illumination regions of the high-beam headlamps, which otherwise could occur due to the reflecting object on the road such as a sign or the like detected as the vehicle-estimated object by the image recognition part 42, is reduced.

Specifically, in step 408, the illumination blocked region of the high-beam headlamp extended in step 406 is prohibited from restoring to the original state. More specifically, with respect to the illumination blocked region of the right high-beam headlamp, the boundary line of the illumination blocked region is prohibited from moving from the line B toward the line A2. In this case, the boundary line of the illumination blocked region is kept at the line B; however, the position of the line B may be changed dynamically according to the change in the position, etc., of the object (the reflecting object on the road in the example illustrated in FIG. 5A) detected as the vehicle-estimated object X1 updated constantly. For example, if the reflecting object on the road is a stationary object as illustrated in FIG. 5A, the image portion of the reflecting object moves in the right direction in the front circumstance image as the vehicle travels. Correspondingly, the line B may be moved in the right direction according to the movement of the reflecting object in the front circumstance image. The movement of the line B may be implemented in a feedback manner. For example, the illumination region line B of the high-beam headlamp may be moved whenever the reflecting object is illuminated again by the high-beam headlamp (i.e., whenever the reflecting object is detected again as the vehicle-estimated object by the image recognition part 42) as the vehicle travels. In this case, the line B is stationary before the reflecting object is illuminated again by the high-beam headlamp as the vehicle travels, and the line B moves outwardly whenever the reflecting object is illuminated again by the high-beam headlamp as the vehicle travels. Alternatively, the movement of the line B may be implemented in a feedfoward manner. For example, if the position of the object detected as the vehicle-estimated object X1 (the absolute position or the relative position of the reflecting object on the road in the example illustrated in FIG. 3) can be calculated in the case of using the stereo camera, etc., the position of the line B may be determined according to the position of the object detected as the vehicle-estimated object X1 (such that the object detected as the vehicle-estimated object X1 is not illuminated by the high-beam headlamps). Further, the position of the line B may be updated based on the change in the traveling direction of the vehicle (detected by a steering sensor), the vehicle speed and the change in the vehicle position (detected by a vehicle speed sensor or a GPS receiver) such that the object detected as the vehicle-estimated object X1 is not illuminated by the high-beam headlamps.

In step 409, the illumination blocked region of the high-beam headlamp, which has been extended in step 406, is permitted to reduce to the original state. More specifically, with respect to the illumination blocked region of the right high-beam headlamp, the boundary line of the illumination blocked region is permitted to move from the line B toward the line A2. In this way, the illumination blocked region of the high-beam headlamp, which has been extended in step 406, is restored to the original state (the state illustrated in FIG. 5A, for example).

As described above, according to the process illustrated in FIG. 4, when the object other than another vehicle such as the reflecting object on the road (a sign or the like) is detected as the vehicle-estimated object, the illumination regions of the high-beam headlamps are limited such that the vehicle-estimated object is not illuminated; however, after the limitation, even if the object, which has been detected as the vehicle-estimated object, is not detected as the vehicle-estimated object, the limitation on the illumination regions of the high-beam headlamps is kept until the image portion related to the object, which has been detected as the vehicle-estimated object, moves out of the angle of view of the camera. Therefore, the repetition of the expansion and the reduction of the illumination regions of the high-beam headlamps is reduced advantageously.

Figure 6:
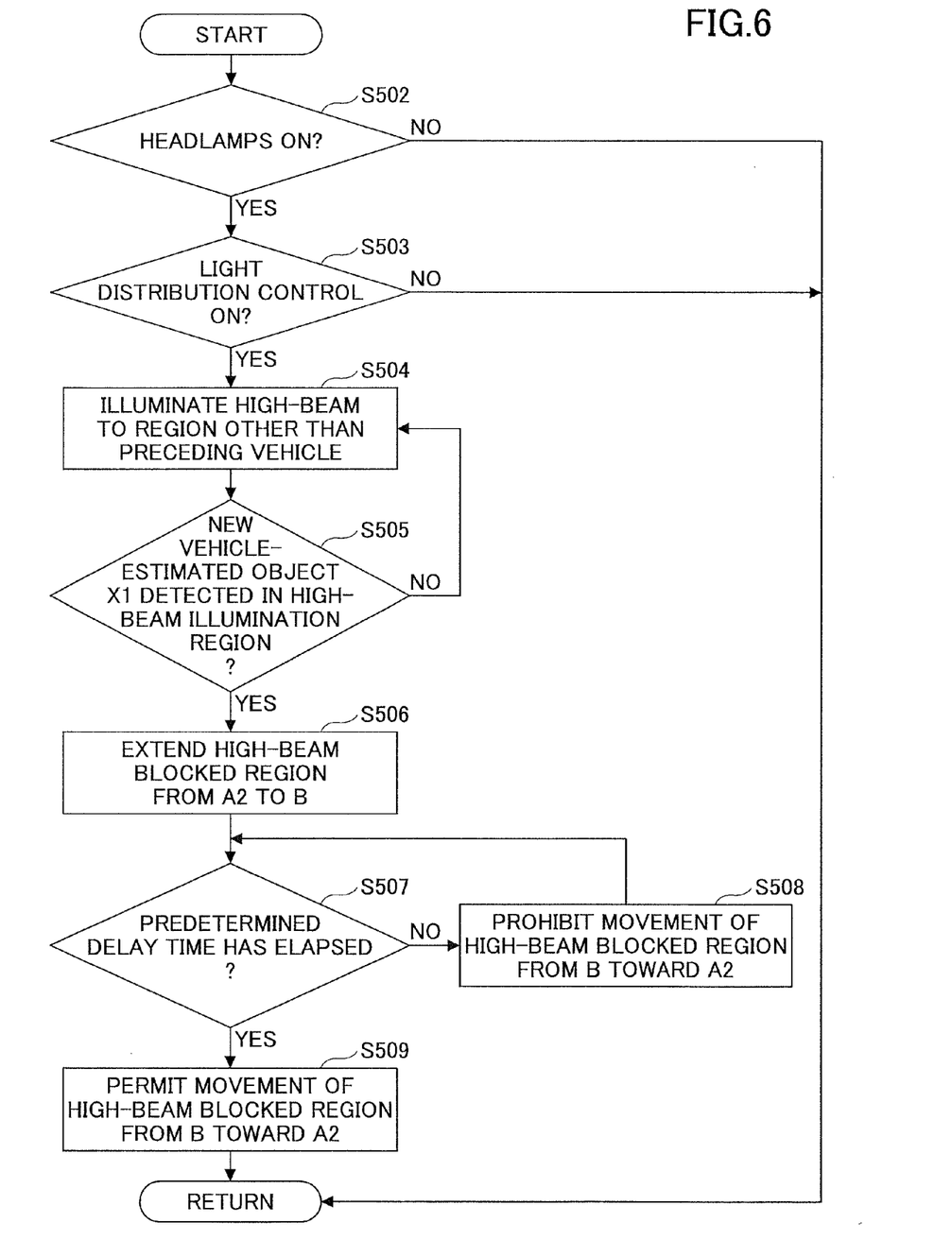
FIG. 6 is another example of a flowchart of a main process executed by a control ECU 40 according to the embodiment.

FIG. 6 is another example of a flowchart of a main process executed by the control ECU 40 according to the embodiment. The process routine shown in FIG. 6 may be initiated when an ignition switch of the vehicle is turned on.

The processes illustrated in FIG. 6 may be substantially the same as the corresponding processes illustrated in FIG. 4 except for step 507. Thus, the process of step 507 is described hereinafter.

In step 507, it is determined whether a predetermined delay time has elapsed from the time of the process for extending the illumination blocked region executed in step 506. Of course, the predetermined delay time is substantially longer than the image recognition process cycle of the image recognition part 42. Ideally, the predetermined delay time corresponds to the time until the image portion related to the new vehicle-estimated object detected in step 505 disappear, moving out of the angle of view of the camera. The predetermined delay time may be a predetermined fixed time. Alternatively, the predetermined delay time may be a variable time. In this case, the predetermined delay time may be determined by considering the experimental data or the prediction value of a distance between a typical reflecting object on the road (a sign or the like) and the host vehicle at the time when the reflecting object is detected as the vehicle-estimated object by the image recognition part 42. In this case, the predetermined delay time may correspond to the time obtained by dividing the distance by the vehicle speed (the current vehicle speed or an average vehicle speed). Alternatively, if the position of the object detected as the vehicle-estimated object X1 (the absolute position or the relative position of the reflecting object on the road in the example illustrated in FIG. 3) can be calculated in the case of using the stereo camera, etc., the predetermined delay time may be set according to the position (i.e., the distance from the host vehicle) of the object detected as the vehicle-estimated object X1. In this case, the predetermined delay time may correspond to the time obtained by dividing the distance between the object detected as the vehicle-estimated object X1 and the host vehicle by the vehicle speed (the current vehicle speed or an average vehicle speed).

In this way, according to the process illustrated in FIG. 6, when the object other than another vehicle such as the reflecting object on the road (a sign or the like) is detected as the vehicle-estimated object, the illumination regions of the high-beam headlamps are limited such that the vehicle-estimated object is not illuminated; however, since the limitation is kept for the predetermined delay time, the repetition of the expansion and the reduction of the illumination regions of the high-beam headlamps is reduced advantageously.

Figure 7:
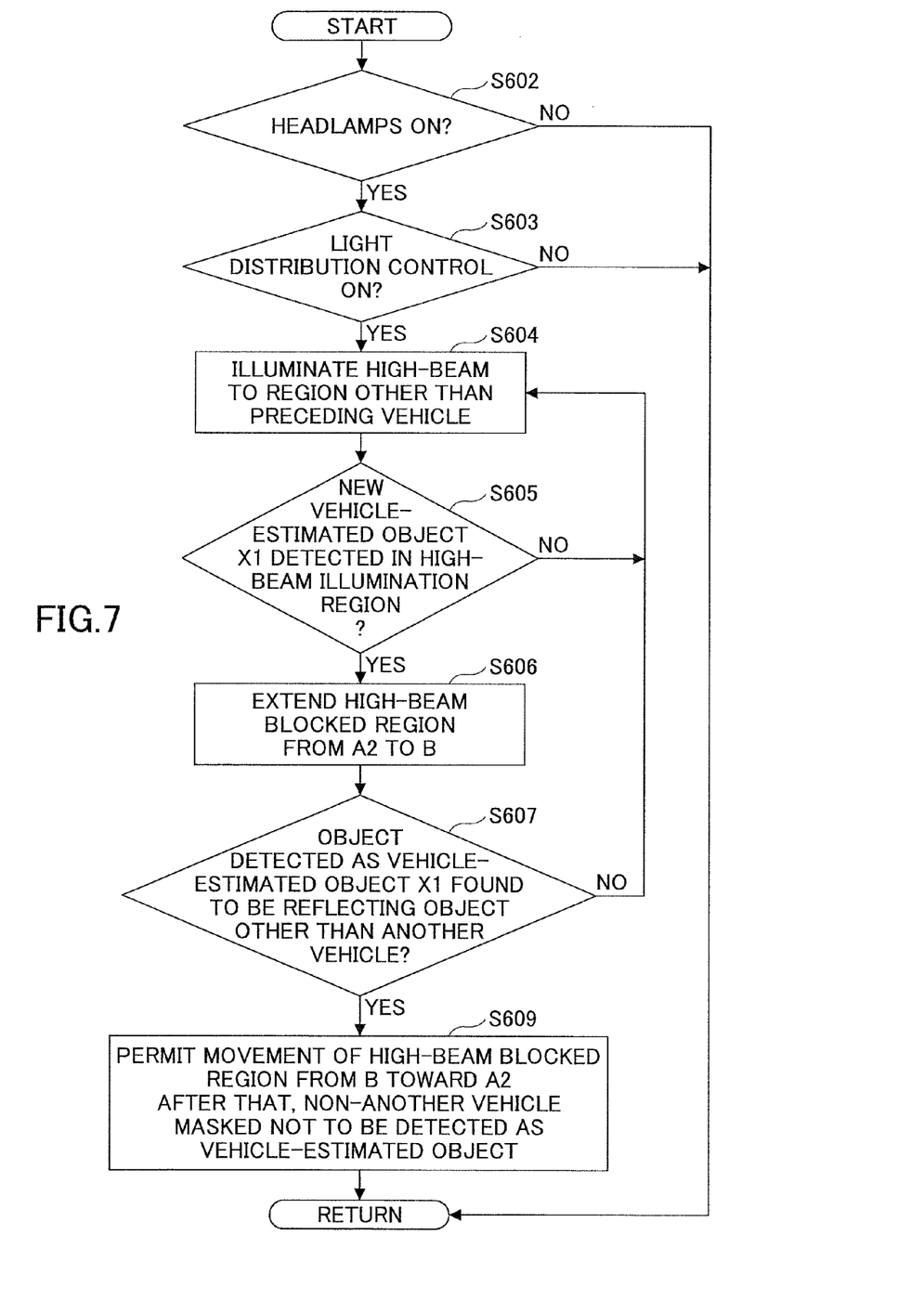
FIG. 7 is another example of a flowchart of a main process executed by a control ECU 40 according to the embodiment.

FIG. 7 is another example of a flowchart of a main process executed by the control ECU 40 according to the embodiment. The process routine shown in FIG. 7 may be initiated when an ignition switch of the vehicle is turned on.

The processes of step 602 through 606 illustrated in FIG. 7 may be substantially the same as the corresponding processes of step 402 through 406 illustrated in FIG. 4. Thus, the processes unique to FIG. 7 are described hereinafter.

In step 607, it is determined again in the image recognition part 42 whether the new vehicle-estimated object detected in step 605 is another vehicle or a reflecting object other than another vehicle (This re-determination is performed after extending the boundary line of the illumination blocked region of the high-beam headlamp to the line B). Here, if the new vehicle-estimated object detected in step 605 is actually a vehicle, it is detected as the vehicle-estimated object because of the fact that the vehicle itself emits the light. Thus, even if the illumination regions of the high-beam headlamps are limited such that the vehicle-estimated object is not illuminated by the high-beam headlamps, it is continuously detected as the vehicle-estimated object by the image recognition part 42. In contrast, if the new vehicle-estimated object detected in step 605 is not actually a vehicle (i.e., a reflecting object other than another vehicle), it is not detected as the vehicle-estimated object by the image recognition part 42 after the illumination regions of the high-beam headlamps are limited such that it is not illuminated by the high-beam headlamps because it does not emit the light by itself. Thus, the determination whether the new vehicle-estimated object detected in step 605 is another vehicle or a reflecting object other than another vehicle may be implemented by utilizing this difference. If the new vehicle-estimated object detected in step 605 is another vehicle, the process routine returns to step 604 where the lampshade controlling part 46 limits the illumination regions of the high-beam headlamps such that the preceding vehicle and the new vehicle-estimated object are not illuminated by the high-beam headlamps. On the other hand, if the new vehicle-estimated object detected in step 605 is not another vehicle (i.e., if the new vehicle-estimated object detected in step 605 is a reflecting object other than another vehicle), the process routine goes to step 609.

In step 609, the illumination blocked region of the high-beam headlamp, which has been extended in step 606, is permitted to reduce to the original state. More specifically, with respect to the illumination blocked region of the right high-beam headlamp, the boundary line of the illumination blocked region is permitted to move from the line B toward the line A2. However, in this case, after that, the object determined as the not-another vehicle in step 607 is not handled as the vehicle-estimated object as exception. Specifically, according to an ordinary rule, when the illumination blocked region of the high-beam headlamp is restored to the original state in step 609, the object determined as the not-another vehicle in step 607 is illuminated by the high-beam headlamps again and thus it is detected as the vehicle-estimated object in the image recognition part 42. However, according to the embodiment, while the object determined as the not-another vehicle in step 607 is tracked in the subsequent front circumstance images, the image recognition part 42 does not detect the not-another vehicle as the vehicle-estimated object even if the image portion related to the not-another vehicle meets the predetermined criterion as the vehicle-estimated object.

In this way, according to the process illustrated in FIG. 7, if the object other than another vehicle such as the reflecting object (a sign or the like) is detected as the vehicle-estimated object, the illumination regions of the high-beam headlamps are limited such that the vehicle-estimated object is not illuminated by the high-beam headlamps. Then, if it can be determined by the image recognition process after the limitation of the illumination region that the object detected as the vehicle-estimated object is not another vehicle, the limitation is canceled, and then the object other than another vehicle is masked such that it is not detected again as the vehicle-estimated object. With this arrangement, the repetition of the expansion and the reduction of the illumination regions of the high-beam headlamps is reduced advantageously. It is noted that, according to the process illustrated in FIG. 7, with respect to the object other than another vehicle such as a sign, soon after the illumination regions of the high-beam headlamps are limited such that it is not illuminated by the high-beam headlamps, the limitation is cancelled and thus the status in which it is illuminated by the high-beam headlamps continues; however, there is no problem such as causing the glare to the driver of another vehicle because the object other than another vehicle such as a sign is not another vehicle.

The present invention is disclosed with reference to the preferred embodiments. However, it should be understood that the present invention is not limited to the above-described embodiments, and variations and modifications may be made without departing from the scope of the present invention.

For example, the embodiment described above is related to the illumination regions of the high-beam headlamps; however, it can be applied as well to the illumination regions of the low-beam headlamps. For example, with respect to the low-beam headlamps, the repetition of the expansion and the reduction of the illumination regions due to the reflecting object adhered to or provided on the road is reduced advantageously.

Further, according to the embodiment described above, the vehicle-estimated object is detected using only the front circumstance images obtained by the image sensor 10; however, the vehicle-estimated object may be detected additionally using other information. For example, the vehicle-estimated object may be detected utilizing the information of another vehicle (the existence, the position, the speed, etc., of another vehicle) obtained from various radar apparatuses such as a millimeter wave radar or a laser radar, the information of another vehicle (the existence, the position, the speed, etc., of another vehicle) obtained via the vehicle-to-vehicle communication, etc.

Figure 8:
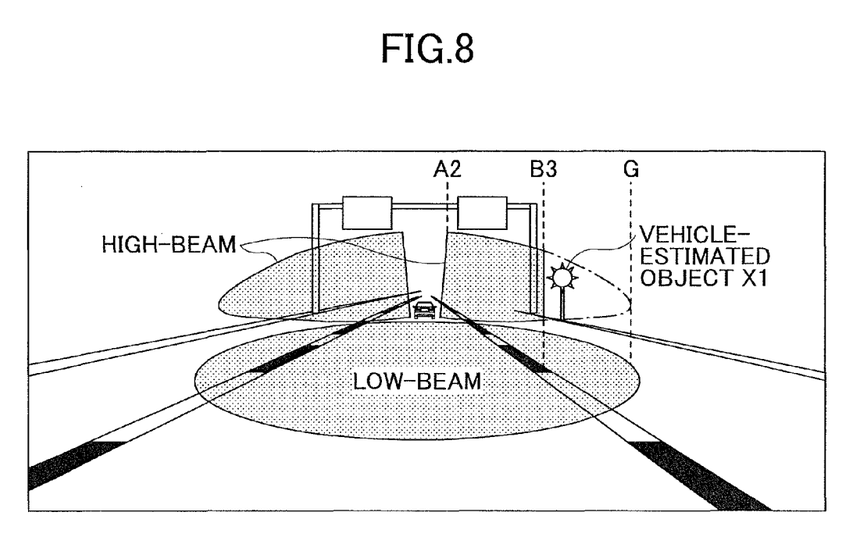
FIG. 8 is a diagram for illustrating another example of a way of limiting the illumination regions of high-beam headlamps of the headlamp 50.

Further, according to the embodiment described above, the illumination regions of the high-beam headlamps are limited such that the limitation extends in the right and left directions (Y1 and Y2 directions) from a center line O in the lateral direction as illustrated in FIG. 3, etc.; however, the illumination regions of the high-beam headlamps may be limited in any manner. For example, instead of the way of limiting the illumination regions of the high-beam headlamps illustrated in FIG. 5B, the illumination regions of the high-beam headlamps may be limited such that the region outside (on the right side) of the line B3 (the line offset in the left direction with respect to the left end of the vehicle-estimated object) is not illuminated, as illustrated in FIG. 8. Specifically, the illumination regions of the high-beam headlamps may be limited from two directions by the movement of the line A2 from the center line O in the lateral direction and the movement of the line B3 from the outermost line G. It is noted that FIG. 8 illustrates the scene of the front circumstance image.

Further, according to the embodiment described above, the illumination regions of the high-beam headlamps are limited in the lateral direction; however, instead of it or in addition to it, they may be limited in the vertical direction (i.e., the up and down directions). For example, in the case of the up and down directions, the repetition of the expansion and the reduction of the illumination regions due to the reflecting object provided immediately above the road, such as a road sign, is reduced advantageously.

The invention claimed is:

1. A vehicle light distribution control apparatus, comprising:
   a camera configured to capture a scene in a forward direction of the vehicle;
   a lighting apparatus configured to illuminate a forward direction of the vehicle with illumination light; and
   a controller configured to detect an image portion in an image captured by the camera as an object estimated as another vehicle when the image portion meets a predetermined criterion, and control a light distribution of the illumination light based on a detection result, wherein
   if the controller detects the object estimated as another vehicle within an illumination region of the illumination light, the controller limits the illumination region of the illumination light of a high beam such that the object estimated as another vehicle is not illuminated by the illumination light of the high beam; then if the image portion related to the object detected as the object estimated as another vehicle does not meet the predetermined criterion, the controller cancels the limitation on the illumination region of the illumination light of the high beam and determines that the object detected as the object estimated as another vehicle is a reflecting object other than another vehicle; and then even if an image portion related to the object determined as the reflecting object other than another vehicle meets the predetermined criterion, the controller prohibits the limitation on the illumination region of the illumination light of the high beam with respect to the image portion related to the object.

2. The vehicle light distribution control apparatus of claim 1, wherein the controller detects the image portion in the image captured by the camera as the object estimated as another vehicle, the image portion having features of light which meet the predetermined criterion.

3. The vehicle light distribution control apparatus of claim 1, wherein the object estimated as another vehicle is detected based on at least one of features including brightness of an image portion in the image captured by the camera, a movement of the image portion and a color of the image portion.

4. A method of controlling a vehicle light distribution, comprising:
   obtaining an image from a camera which captures a scene in a forward direction of the vehicle;
   illuminating a forward direction of the vehicle with illumination light of a high beam of a lighting apparatus;
   detecting an image portion in an image captured by the camera as an object estimated as another vehicle when the image portion meets a predetermined criterion;
   limiting an illumination region of the illumination light of the high beam such that the object estimated as another vehicle is not illuminated by the illumination light of the high beam if the object estimated as another vehicle is detected within the illumination region of the illumination light of the high beam;
   canceling the limitation on the illumination region of the illumination light of the high beam and determining that the object detected as the object estimated as another vehicle is a reflecting object other than another vehicle, if the image portion related to the object detected as the object estimated as another vehicle does not meet the predetermined criterion after limiting the illumination region of the illumination light of the high beam; and
   prohibiting the limitation on the illumination region of the illumination light of the high beam with respect to an image portion related to the object determined as the reflecting object other than another vehicle, even if the image portion meets the predetermined criterion.

* * * * *